United States Patent
Yamane

[11] Patent Number: 6,005,312
[45] Date of Patent: *Dec. 21, 1999

[54] HIGH SPEED, HIGH TORQUE MULTIPOLE BRUSHLESS MOTOR

[75] Inventor: Shuichi Yamane, Yonago, Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/500,573

[22] Filed: Jul. 11, 1995

[30] Foreign Application Priority Data

Jul. 14, 1994 [JP] Japan .................................. 6-162034

[51] Int. Cl.$^6$ .................................................. H02K 15/00
[52] U.S. Cl. ......................... 310/67 R; 310/91; 310/42; 310/90
[58] Field of Search ............................. 310/90, 91, 67 R, 310/156, 42; 384/107, 112

[56] References Cited

U.S. PATENT DOCUMENTS

| | | | |
|---|---|---|---|
| 4,037,125 | 7/1977 | Aoki | 310/248 |
| 4,200,344 | 4/1980 | Binns et al. | 308/9 |
| 4,219,752 | 8/1980 | Katou | 310/156 |
| 4,429,240 | 1/1984 | Kishi | 310/45 |
| 4,517,480 | 4/1985 | Mueller | 310/68 R |
| 4,757,222 | 7/1988 | Shiraki et al. | 310/68 B |
| 4,874,973 | 10/1989 | Matsushita et al. | 310/78 |
| 4,940,937 | 7/1990 | Hattori et al. | 310/155 |
| 4,961,017 | 10/1990 | Kakinoki et al. | 310/71 |
| 4,975,607 | 12/1990 | Hara et al. | 310/67 R |
| 5,059,844 | 10/1991 | Anstine | 310/90 |
| 5,291,358 | 3/1994 | Takahashi | 360/99.08 |
| 5,337,374 | 8/1994 | Konishikawa | 384/107 |
| 5,392,178 | 2/1995 | Nishio et al. | 360/99.08 |
| 5,453,973 | 9/1995 | Nishio | 369/266 |
| 5,559,382 | 9/1996 | Oku et al. | 310/90 |
| 5,578,883 | 11/1996 | Sakashita et al. | 310/91 |

FOREIGN PATENT DOCUMENTS 5-4752  1/1993  Japan .

Primary Examiner—Nestor Ramirez
Assistant Examiner—Burton Mullins
Attorney, Agent, or Firm—Ratner & Prestia

[57] ABSTRACT

A brushless motor includes a rotor unit comprised of a spindle and a multi-polarized magnet arranged around the spindle. A bearing housed inside a bearing housing having a circular flange formed therearound, and rotatably supports the spindle so that the rotor unit can rotate. A substrate provided with a stator unit on its top surface but nothing with its bottom surface. The bearing housing is fixed to the substrate such that a top surface of the flange and the bottom surface of the substrate is in a tight contact as a reference surface for location.

25 Claims, 4 Drawing Sheets

HIGH SPEED, HIGH TORQUE MULTIPOLE BRUSHLESS MOTOR

BACKGROUND OF THE INVENTION

1. Field of the Invention

The present invention relates to brushless motors such as a spindle motor, a capstan motor, and a reel motor for driving with a greater torque in high speed and, more particularly, to a brushless motor for use in a compact disk player or CD-ROM drive and a video cassette recorder (VCR) used in the fields of office automation and audio-visual system.

2. Description of the Prior Art

Recently, brushless motors such as spindle motors rotatable at much more faster speeds and with increased torque are required as the development of CD-ROMs which can drive in double-speed and quad-speed of the standard type. To satisfy such requirements, it is also required to develop the brushless motors improved in the perpendicularity of spindle and the discarding the heat generated thereby.

With reference to FIGS. 7 and 8, a conventional spindle motor, as one example of brushless motors, is described below. In FIG. 7, a cross-sectional view of a conventional spindle motor is shown. This conventional spindle motor Mp has a rotor frame 41 including a multi-polarized rotor magnet 42 and a spindle 43. A stator core 44 is comprised of a plurality of core plates each insulated by an insulating material, and is configured to have plural poles corresponding to the multi-polarized magnet 42. Thus formed stator core 44 is further covered by a molded insulator 414 made by molding an insulating material such as resin therearound.

Each pole portion of thus formed stator core 44 is wound up to a wire coil 45 whose ends are soldered to a stator substrate 411 wherein electric circuit components are mounted. The stator core 44 is fixedly supported by a bearing housing 47. The bearing housing 47 also supports a spindle bearing 48. The spindle bearing 48 rotatably supports the spindle 43.

The bearing housing 47 is provided with a first thinner circular wall 420 extending along the axis from the bottom end thereof, and is further provided with a second thinner circular wall 422 around the first circular wall 420. The bearing housing 47 is placed in an opening hole of the stator substrate 411 such that the second circular wall 422 being engaged with that opening hole. The bottom end surface around the second circular wall 422 seats on the upper surface of the substrate 411. A thrust plate 49 is provided at the inner bottom of the bearing housing 47, as inserted inside the first circular wall 420, for receiving the spindle 43 at a thrust receptor 410 formed therein against its thrust force.

Thus prepared bearing housing 47 is installed to the stator substrate 411 by bending up the second circular wall 422 outwardly to caulk it together with the bottom surface of the substrate 47. The first circular wall 420 is bend inwardly to caulk it with the thrust plate 49. Thus, the brushless motor Mp is assembled.

With this type of brushless motor, the upper surface of the substrate 411 which is used as a reference or standard plane for the installation of the bearing housing 47, as described above, is provided with a copper foil 416.

However, the copper foil 416 is adhered to this reference/standard surface of the stator substrate 411 by a non-rigid adhesive agent. Therefore, the surface of thus adhered foil 416 is uneven due to the non-rigidity of the agent even if such adhesive agent can be applied with a uniform thickness. Therefore, the perpendicularity of the bearing housing 47 with respect to the substrate 411 can not be secured.

Since the bearing housing 47 rotatably supports the spindle 43 via the spindle bearing 48, the perpendicularity of the spindle 43 with respect to this reference surface also varies accordingly. This is inevitable even if each of components such as bearing housing 47 and substrate 411 are machined with a high accuracy. As a result, it is very difficult to securely install all the rotation relating members such as spindle 43, bearing 48, bearing housing 47, stator core 44, magnet 42, and rotor frame 41 within a predetermined concentricity.

Furthermore, the dimensional accuracy such as thickness and diameter of the second circular wall 422 after caulking can not be secured. Therefore, the bottom portion of the substrate 411, including the bearing housing 48, can not be used as reference or standard surfaces in both the horizontal and vertical directions for positioning.

As a result, the dimensional accuracy of the spindle motor Mp such as perpendicularity and concentricity of the component members thereof can not be secured when the motor Mp is installed to other mating instruments such as CD-ROM drive and VCR. In this case, therefore, special tools or instruments for detecting and correcting the positions of the rotating members, especially the spindle 43, are necessary to install thus assembled spindle motor Mp accurately. This is inevitable, even if CD-ROM drive's installation place for mating with the brushless motor is machined with a great accuracy.

It is to be noted that it is very difficult to disassemble the conventional brushless motor Mp if once assembled, because the bearing housing 47, thrust plate 49, and the substrate 411 are caulked by the circular walls 420 and 422 with the substrate 411 and the thrust plate 49. Re-caulking the caulked walls 420 and 422 requires great efforts, and causes a unrecoverable damage thereof with respect to the mechanical strength and dimensional accuracy.

Furthermore, the heat generated by wire coil 45 is well insulated by the molded insulator 414 from dissipating to the externals through the heat conductive members of stator core 44, bearing housing 47, bearing 48, spindle 43, and thrust plate 49, and then causes the over heat of the motor Mp. Therefore, a special cooling device is necessary when this type of spindle motor is driven in a higher speed with a greater torque.

SUMMARY OF THE INVENTION

The object of the present invention is therefore to provide a brushless motor which solves these problems.

The present invention has been developed with a view to substantially solving the above described disadvantages and has for its essential object to provide an improved brushless motor drive apparatus.

In order to achieve the aforementioned objective, a brushless motor comprises a rotor means provided with a spindle means and a plurality of magnet means arranged around said spindle means; a rotor support means comprising a flat surface means and supporting means for rotatably supporting said spindle means so that said rotor means can rotate; and a stator means comprising first and second surface means opposed to each other and provided with a magnetic field generation means on said first surface for generating a magnetic field working on said multi-polarized magnet means to rotate said rotor means, said second surface being in contact with said installation surface of said rotor support means.

BRIEF DESCRIPTION OF THE DRAWINGS

The present invention will become more fully understood from the detailed description given below and the accompanying diagrams wherein.

DESCRIPTION OF PREFERRED EMBODIMENT

Figure 1:
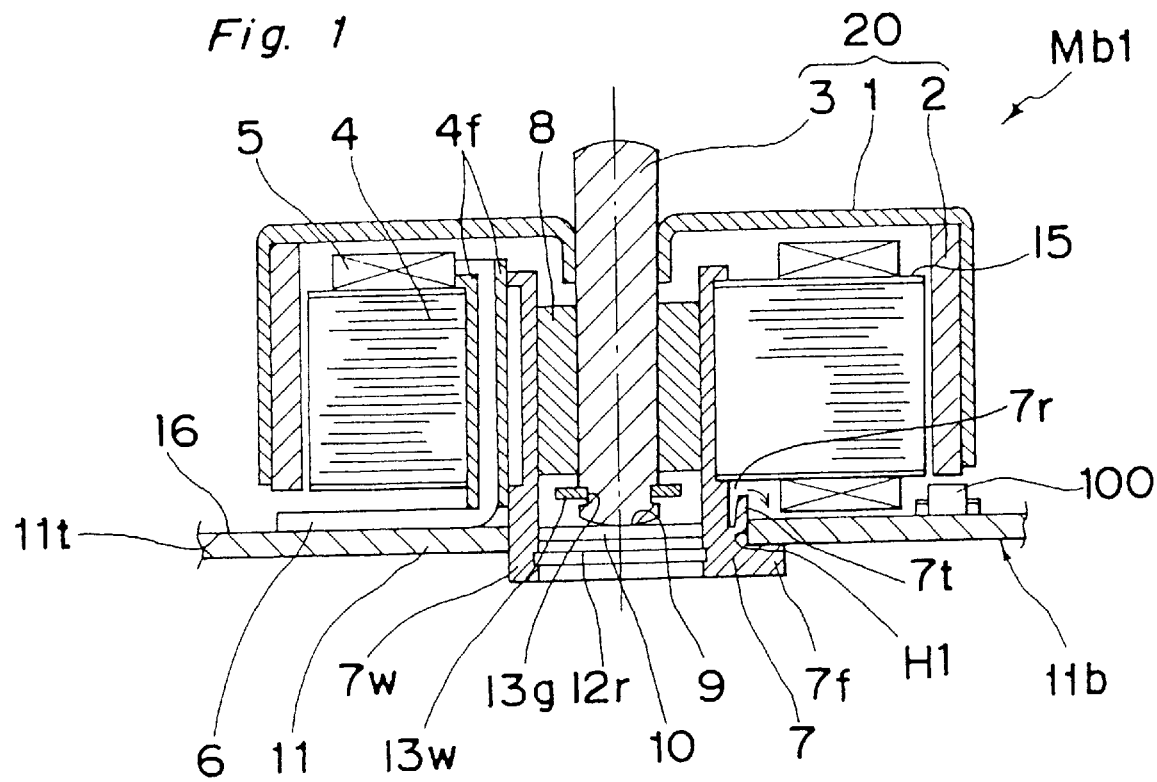
FIG. 1 is a cross-sectional view showing a brushless motor according to a preferred embodiment of the present invention.

Referring to FIG. 1, a preferred embodiment of a brushless motor according to the present invention is shown. This brushless motor Mb1 has a rotor frame 1 configured in generally a cylindrical shape defined by a circular top plate and a circumferential wall extending from the circumference of the top plate along with an axis thereof, and is opened at one end. The rotor frame 1 has a multi-polarized magnet 2 provided on the inner surface of the circumferential wall thereof. A spindle 3 is mounted on the rotor frame 1 in alignment with the axis thereof and extruding from the rotor frame 1 in both directions by predetermined lengths. Thus, the rotor frame 1, rotor magnet 2, and spindle 3 construct a rotor unit 20.

The spindle 3 is provided with a groove 13g formed in the circumference of the bottom end thereof. A spindle bearing 8 configured in a tubular shape shorter than the spindle 3 is provided for rotatably supporting the spindle 3 as being housed in an inner tubular space thereof. The spindle bearing 8 is preferably made of a sintered metal or an oil impregnated material in this example. A washer 13w is engaged in the bottom groove 13g to prevent the removal of bearing 8 from the rotor unit 20. The top end of the spindle 3 projects by the predetermined length from the top plate of the rotor frame 1, as described in the above. This projected portion of the spindle 3 is used for taking its rotation and force therefrom, and is usually referred to as "a power output spindle".

A stator core 4 is comprised of a plurality of core plates, each insulated to the other, to configure plural pole portions corresponding to the multi-polarized magnet 2. Thus formed stator core 4 is coated with a thin film 15 formed of an electrically insulating material by utilizing an electro-deposition or electro-coating process. This insulating film 15 is so thin as any in the range of 10 $\mu$m and 90 $\mu$m, and preferably 30 $\mu$m, but is enough for electrically insulating the stator core 4. Over this thin film 15, each pole portion is wound by a wire up to a coil 5 connected with a wiring pin 6. The wiring pin 6 is soldered to a stator substrate 11 which will be described later with reference to FIG. 2. A bearing housing 7 is provided for housing the bearing 8.

Figure 3:
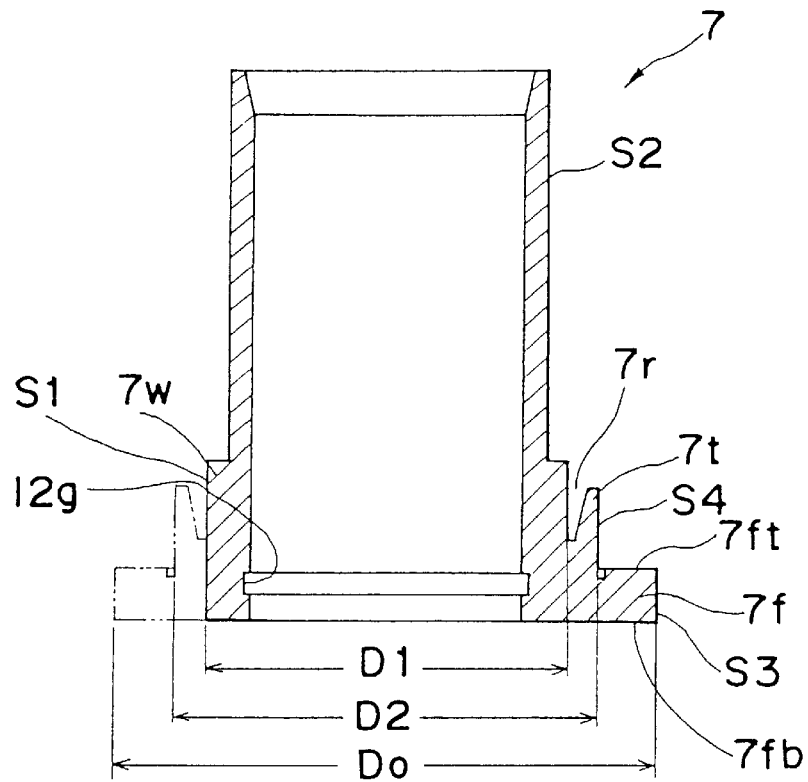
FIG. 3 is a cross-sectional view showing a bearing housing of the brushless motor of FIG. 1 on an enlarged scale.

Referring to FIG. 3, the bearing housing 7 of FIG. 1 is shown on an enlarged scale. The bearing housing 7 is formed in generally a cylindrical shape defined by a cylindrical wall 7w extending along an axis and opened at both ends is provided. The cylindrical wall 7w is defined by a first outer circumferential surface S1 having a predetermined diameter D1 and an inner circumferential surface. The outer circumferential surface S1 shrinks in the radial direction at a position above the bottom portion thereof, and then extends upward with a second predetermined diameter smaller than the first predetermined diameter D1 to form a second outer circumferential surface S2 therearound. The stator core 4, prepared as described in the above, is engaged and fixed to this second counter circumferential surface S2 by a suitable fixing member 4f (FIG. 1).

The bearing housing 7 is provided with a bottom flange 7f configured in a ring-like shape having a predetermined outer diameter Do and formed around the bottom end of the cylindrical wall 7w. The bottom flange 7f radially extends from the first circumferential surface S1 by a predetermined length with a predetermined thickness. Thus, the bottom flange 7f is defined by top and bottom surfaces 7ft and 7fb extending parallel to each other and a third outer circumferential surface S3 (corresponding to the diameter Do) substantially perpendicular to the surfaces 7ft and 7fb. Note that these surfaces 7ft and 7fb are perpendicular to the axis in which the bearing housing 7 extends.

The bottom flange 7f is provided with a second cylindrical wall 7t formed around and proximal to the first circumferential surface S1 (cylindrical wall 7w) on the upper surface 7ft thereof. Thus, as shown in FIG. 3, a recess 7r is formed betgween cylindrical wall 7w and second cylindrical wall 7t. The second cylindrical wall 7t extends in the longitudinal direction of the bearing housing 7, with a predetermined thickness, by a predetermined length longer than a thickness of the stator substrate 11. Thus, the second cylindrical wall 7t has a fourth outer circumferential surface S4 defined by a diameter D2. The second cylindrical wall 7t extends along the axis of the housing 7, and is perpendicular to the bottom flange 7f (7ft and 7fb). The bearing housing 7 is also provided with a circular groove 12g formed in the inner circumference and running therearound substantially parallel and proximal to the bottom end of the housing 7. The bearing housing 7 is machined and finished very precisely in dimensions.

Referring back to FIG. 1, a C-shaped ring 12r is inserted in the circular groove 12g passing through the bottom opening of the bearing housing 7 so that the C-shaped ring 12r expands inside the groove 12g to engage therewith. Before inserting the C-shaped ring 12r into the housing 7, a spindle receptor plate 10 is placed above the groove 12g. Thereafter, the C-shaped ring 12r is engaged in the groove 12g. Thus, the C-shaped ring 12r prevents the thrust receptor plate 10 from dropping down due to the thrust force applied thereto.

Figure 4:
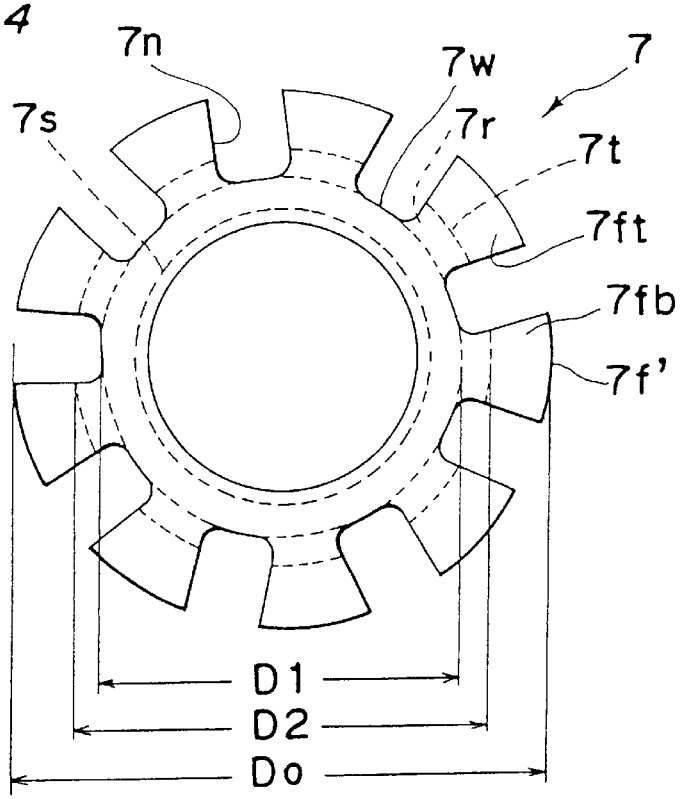
FIG. 4 is a bottom view of the bearing housing of FIG. 3.

Referring to FIG. 4, the bearing housing 7 of FIG. 3 as viewed from the bottom side thereof is shown. The bottom flange 7f is cut away by a predetermined width at a predetermined interval from the third circumference S3 to the first circumferential surface S1. Thus, the flange 7f is divided into plural tabs 7f' each separated by notches 7n and arranged around the first cylindrical wall 7w of bearing housing 7. As a result, the bottom of the bearing housing 7 is configured in generally a gear-like shape having a plurality of teeth (tabs 7f'), nine in this example, extending in radial directions from the minor diameter D1 to the major diameter Do.

Although these notches 7n can be formed by a machining process as well as a drawing process used for manufacturing the bearing housing 7, the drawing process is preferable in consideration of the manufacturing efficiency. Because, under the drawing process, the bearing housing 7 according to the present invention can be formed from a bar material which is kept as being held once by the tool during the manufacturing process. However, under the machining process, such tools should be repeatedly operated to re-chuck and release for machining different portions of the bar material.

Referring back to FIG. 1, the side view of stator substrate 11 is shown. The stator substrate 11 is made of a flat and rigid metal plate having opposite surfaces extending straight and parallel to each other. Both surfaces are precisely machined and finished very accurately, wherein the straightness and flatness at each surface are secured within the allowable tolerance.

A top surface 11t located above a bottom surface 11b thereof, as shown in FIG. 1, is provided with a copper foil 16 adhered thereto by an adhesive agent, but nothing on the bottom surface 11b. The surface of foil 16 adhered to the top surface 11t is uneven, even if the foil 16 with a secured thickness is used, because the adhesive agent is non-rigid material and easily deforms due the external force applied thereto. As a result, the flatness of the substrate 11 (16) on the side of top surface 11t is inferior to that of the bottom surface 11b which is remains in a machined state. The stator substrate 11 is provided with a through hole H1 extending between both surfaces 11t and 11b. On the copper foil 16, electric circuit components 100 are used for driving and controlling the wire coil 5 to generate the magnetic field so that the rotor 20 rotates in a predetermined manner. The stator substrate 11 is provided with a through hole H1 extending between both surfaces 11t and 11b. On the copper foil 16, a circuit component 100 is provided.

Figure 2:
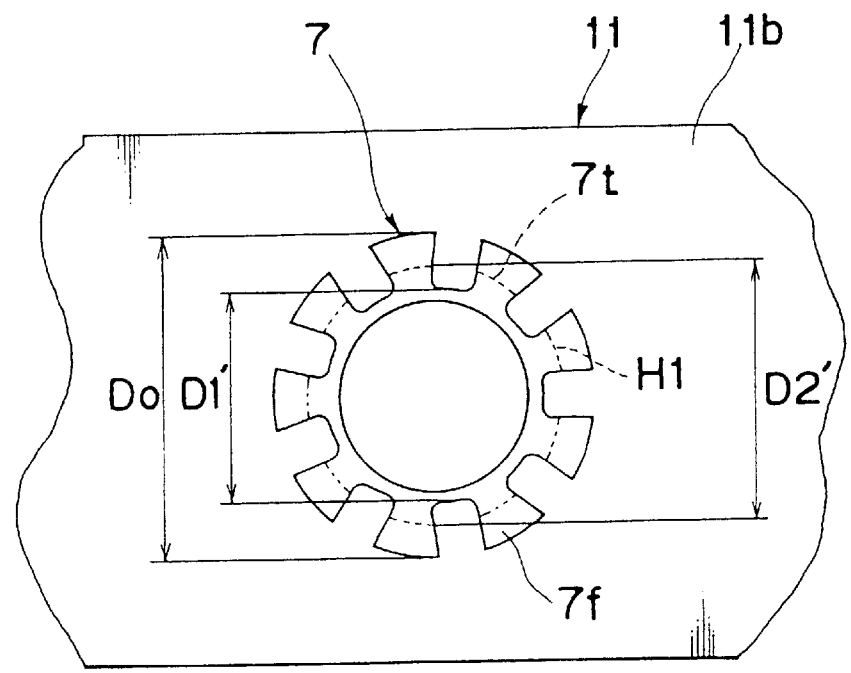
FIG. 2 is a bottom view of the brushless motor of FIG. 1.

Referring to FIG. 2, the brushless motor Mb1 of FIG. 1, as viewed from the bottom side of the bearing housing 7, is shown. Through the bottom of bearing housing 7, the hole H1 formed in the substrate is indicated by dotted lines, but is partially superimposed by solid lines representing the housing 7. The hole H1 is configured in a polygonal shape, similar to but smaller than the bottom outline of the bearing housing 7. The hole H1 is generally defined by two concentric circles D1' and D2' and radial lines connecting therebetween. These circles D1' and D2' are defined by diameters corresponding to the diameters D1 and D2, respectively, of the bearing housing 7. The inner circle D1' is greater than that of the first cylindrical wall 7w, and the outer circles D2' is greater than that of the second cylindrical wall 7t by predetermined fitting allowances, so that the first and second cylindrical walls 7w and 7t (S1 and S4) can be engaged in the holes defined by the circles D1 and D2, respectively, in a smooth and tight manner.

The through hole H1 is defined first by an inner hole corresponding to the circle D1' whose circumference is divided into a predetermined portions arranged in a pattern corresponding to the bearing housing tabs 7f'. From thus divided circumferential portions, the inner hole (D1') extends outward in the radial direction until reaching the circumference D2'. Thus defined polygonal shaped opening H1 corresponding to the bottom outline of the bearing housing 7 confined by the second cylindrical wall 7t is formed in the stator substrate 11.

As best shown in FIG. 1, into thus prepared hole H1, the top end of bearing housing 7 is inserted from the bottom side of the substrate 11. The bearing housing 7 is positioned so that the bottom outline thereof is in alignment with the inner configuration of the hole H1, such that the projecting second wall 7t mates with each of concave portions of the substrate 11 (H1). As each of outer circumferential surfaces S1 and S4 is guided by the inner circumferential profile of the hole H1, the bearing housing 7 is further inserted until top surfaces 7ft of tabs 7f strike the bottom surface 11b of the substrate 11, and the second walls 7t project from the top surface 11a by the predetermined length. At that position, tabs 7t are bent down outwardly, as indicated by an arrow, to caulk the bearing housing 7 together with the substrate 11 firmly.

It is to be noted that the substrate 11 and flange 7f are machined very precisely in dimensions such that dimensional accuracy such as a thickness, diameter, and flatness are highly secured within the tolerance. For example, the diameter can be machined with the accuracy better than of 5 µm. Therefore, every surface of the bearing housing 7 and stator substrate 11, such as the bottom surface 11b and inner circumference of the hole H1, the outer circumferences of second and third walls 7 can be used as reference or standard planes for machining or locating the both components 7 and 11 at precise positions. Thus, the stator core 4, wire coil 5, bearing housing 7, bearing 8, and substrate 11 constructs a stator unit 30. The stator unit 30 rotatably support the spindle 8 of rotor unit 20 by the bearing 8, so as to rotates the rotor unit 20 by controlling the magnetic field generated by the wire coil 5 using the circuit 100 provided on the substrate 11.

In this sense, the bearing housing 7 firmly caulked with the substrate 11 is securely fixed in the vertical direction by the bottom surface 11b of the substrate 11 and the upper surface 7ft of the housing flange 7f with a high accuracy depending on the machining precision thereof. Furthermore, in the horizontal direction, similarly secured by the outer circumferential surfaces S1 and S2 and the inner circumferential surface of the hole H1.

As the bearing housing 7 is firmly secured both in the vertical and horizontal directions with respect to the substrate 11, the perpendicularity thereof is also secured with a great accuracy. The spindle bearing 8 with spindle 3 slidable supported therein is placed inside the bearing housing 7 such that the spindle bottom is placed on the spindle receptor plate 10. It is to be noted that the bearing housing 7, firmly positioned with a highly secured perpendicularity with respect to the substrate 11, embraces the bearing 8 by the inner circumference thereof. Therefore, the bearing 8 and the spindle 3 supported in the bearing 8 are also precisely positioned with secured perpendicularly and concentricity.

Since the spindle plate receptor 10 is easily removed from the bearing housing 7 only by disengaging the C-shaped ring 12r from the groove 12g, the bottom potion of spindle 3 is accessible for removing the washer 13w from the spindle groove 13g . This is very convenient for the maintenance of brushless motor Mb1 after assembling because the motor can be disassembled without breaking thereof.

The wiring pin 6 is provided beside the stator core 4 engaged in the second outer circumferential surface S2 (FIG. 3) of the bearing housing 7. This pin 6 extends from the wire coil 5 along the bearing housing 7w and reaches the copper foil 16 adhered to the substrate 11, passing through the notch 7n formed in the second wall 7t. Note that if the notch 7n is not formed in the housing 7, the second cylindrical wall 7t hampers the pin 6. After reaching the foil 16, the pin 6 bends in the radial direction to further extend above the foil 16 outwardly.

Since the pin 6 is stronger than a magnet wire and is soldered to the substrate 7 through the foil 16, the reliability and durability of the wire core connection can be improved, when compared with the magnet wire. In the conventional brushless motor Mp, the wire coil 45 of the stator 44 is connected to the substrate 411 by soldering a fine and less durable magnetic wire. Additionally, this configuration enables the automated assembling of the brushless motor, resulting in the improved manufacturing efficiency and reduced manufacturing cost.

Furthermore, thus assembled brushless motor Mb1 has high dimensional accuracy of the bottom surface 11b, the third outer circumferential surface S3, and the bottom surface 7fb. Therefore, the brushless motor Mb1 can be positioned accurately only by holding at the above described reference surfaces 11b, S3, and 7fb of substrate 11 and bottom flange 7f. In other words, according to the present invention, the brushless motor Mb1 can be located at a correct position and in a correct pose defined by the accuracy such as flatness and perpendicularity, when the bottom flange 7f is installed in an engaging hole formed with accuracy in the mating partner instrument.

Also, the heat generated by the wire coil 5 during the motor operation will accumulate in the stator core 4 unless such heat is effectively dissipated to the outside of the motor via the heat conductive members such as bearing housing 7 and substrate 11. At worst case, the motor itself as well as the core 4 overheats. However, such heat dissipation is very difficult in the conventional brushless motor, because the thick and molded insulation prevents the thermal transmission from the wire coil 5 to the stator core 4, and also confines the heat inside the core 4.

In consideration of this, the stator core 4 is insulated by the thin film 15, according to the present invention, formed by utilizing an electro-deposition or electro-coating process. This insulating film 15 is very thin such as 30 µm, for example, but is enough for insulating electric power. The film 15 easily transmits the heat generated by the wire core 4 to the bearing housing 7 therethrough, resulting in an effective cooling the core 4 and coil 5.

Furthermore, since stator core 4 is comprised of a plurality of core plates each coated by the insulating material, as described above, the heat resistant ability is greater than the thin film 15. Therefore, the heat generated by the coil 5 is transmitted to the bearing housing 7 through the film 1 more than to the stator core 4. The heat is further transmitted or dissipated externally through a partner instrument to which the brushless motor Mb1 is installed by tightly contacting the substrate 11 and the bearing housing 7 thereto. Thus, the heat is prevented from accumulating in the core 4 and is then dissipated to the outside of the motor passing though the conductive members thereof.

Figure 5:
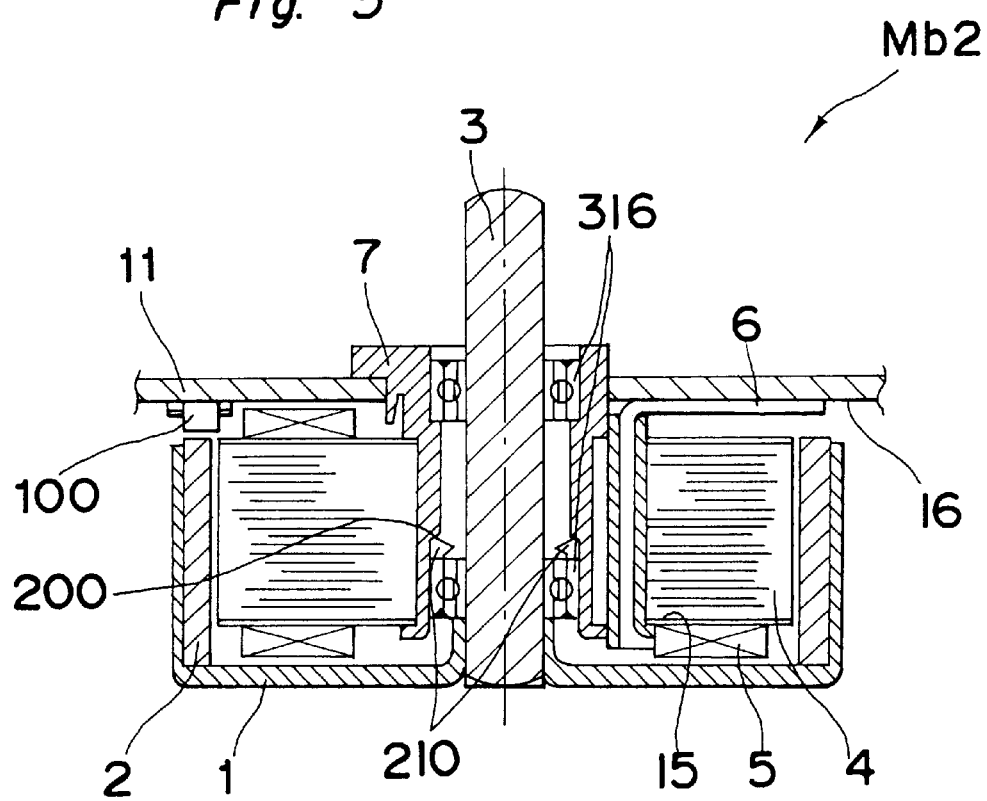
FIG. 5 is a cross-sectional view showing an alternative of the brushless motor of FIG. 1.
Figure 6:
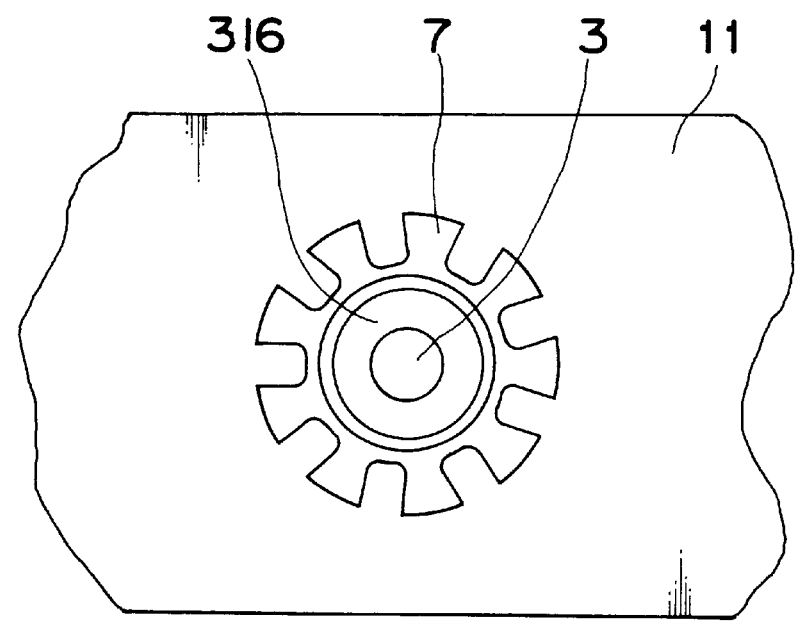
FIG. 6 is a bottom view of the brushless motor of FIG. 5.
Figure 7:
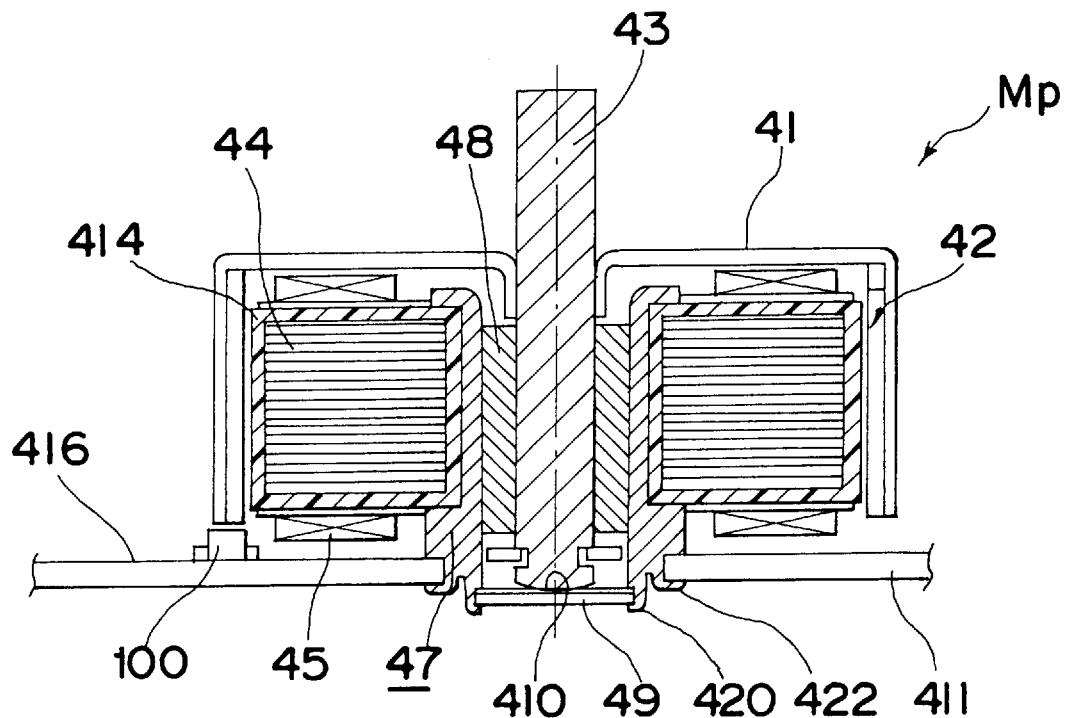
FIG. 7 is a cross-sectional view showing a conventional brushless motor.
Figure 8:
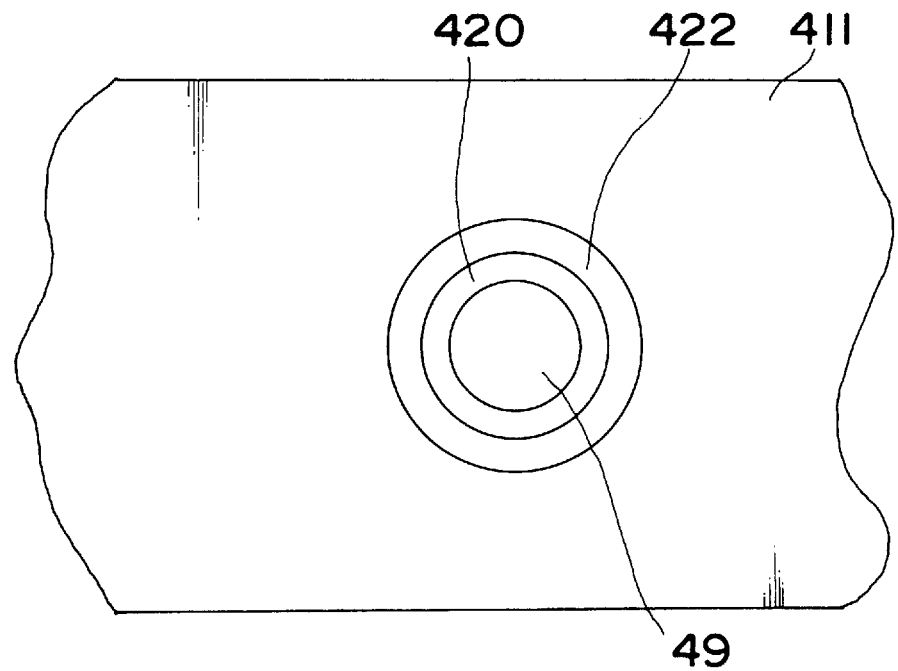
FIG. 8 is a bottom view of the conventional brushless motor of FIG. 7.

Referring to FIGS. 5 and 6, an alternative of brushless motor of FIG. 1 is shown. This alternative brushless motor Mb2 has a construction similar to that of FIG. 1, except that a power output spindle of spindle 3 is located on the opposite side to the motor Mb2 with respect to a stator substrate 11. The top view of this motor Mb2 as viewed from the power output spindle side is shown in FIG. 6. Furthermore, a step 200 is formed around inner circumference of bearing housing 7. Instead of the bearing 8 being a sintered metal type, at least a pair of ball bearings 316 but not limited thereto are seated on the step 200. Note that the ball or roller bearing can provide a generally longer service life than the sintered metal type. An elastic member 210 is placed between the ball bearing 316 and the step 200 for pressing the ball bearing 316, as best shown in FIG. 5.

As apparent from the above, the brushless motor according of the present invention can be installed in the partner instrument with high accuracy. The spindle can be mounted with improved perpendicularity with respect to the installation plane and improved concentricity with respect to the other rotating units thereof. Furthermore, the heat dissipating ability for discarding the heat generated by the wire coils is also improved due to thin film applied to the stator core for electrically insulating from the coil. The wiring pin having a mechanical strength greater than the magnet wire can improves the quality and automated assembling process of the motor, reducing the manufacturing cost.

Note that brushless motor according to the present invention is described above with reference to the spindle motors, however it is needless to say that the present invention is also applicable to other types of brushless motors such as capstan motors, and reel motors.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

I claim:

1. A brushless motor comprising:

rotor means provided with a spindle and a plurality of multi-polarized magnets arranged around said spindle;

stator means including a first surface and a second surface opposed to each other, said stator means for providing a magnetic field which extends towards said multi-polarized magnets to rotate said rotor means, said surface means made of a flat and rigid material; and rotor support means inserted in said stator means and comprising:

a rotor support for rotatably supporting said spindle so that said rotor means can rotate, a flange extending along said second surface for exerting force against said second surface and a projection bendable from a first position before said rotor support means is inserted in the stator means to a second position after said rotor support means is inserted in the stator means, wherein, in said second position said projection is bent towards said first surface to create said force, said projection and said rotor support means forming a recess therebetween wherein said second surface is in contact with an installation surface of said rotor support means.

2. A brushless motor according to claim 1, wherein said rotor support means and said projection form said recess therebetween so that mechanical stress associated with bending of said projection substantially isolated to said projection to substantially prevent said stress from being transmitted to the rotor support means.

3. A brushless motor according to claim 1, wherein said projection extends away from said rotor support means at a location adjacent to said recess, said projection bent to curve away from said rotor support means.

4. A brushless motor according to claim 3, wherein said projection is curved so that it extends perpendicularly away from said rotor support means.

5. A brushless motor as claimed in claim 1, wherein said rotor support means is formed in a tubular shape defined by circumferential wall means for supporting said spindle means and circular flange means formed around said circumferential wall means.

6. A brushless motor as claimed in claim 5, wherein said predetermined diameter is used as a locational reference for positioning said rotor support means with respect to a radial direction thereof.

7. A brushless motor as claimed in claim 5, wherein said circular flange means is cut away from the outer circumference thereof in at least one place.

8. A brushless motor as claimed in claim 5, wherein said stator means further comprises a core means being wound by a wire coil means for generating said magnetic field and coated by an insulating film having a predetermined thickness in a range of 0.01 mm to 0.09 mm.

9. A brushless motor as claimed in claim 5, wherein said rotor support means is provided with a thrust force receiving member therein for receiving a thrust force acting along an axial direction in which said rotor support means extends.

10. A brushless motor as claimed in claim 9, wherein said rotor support means is further provided with a supporting means for supporting said thrust force receiving member against said thrust force.

11. A brushless motor as claimed in claim 10, wherein said supporting means is an expandable ring means having a diameter which is either i) smaller than the inner diameter of said rotor support means when subjected to a compression force or ii) greater than the inner diameter of said rotor support means when said compression force is removed from said expandable ring means.

12. A brushless motor as claimed in claim 11, wherein said rotor support means is provided with a groove means formed inside said circumferential wall means for receiving said expandable ring means.

13. A brushless motor as claimed in claim 5, wherein said rotor support means is provided with a ball bearing means inside of said circumferential wall means for rotatably supporting said spindle means.

14. A brushless motor as claimed in claim 13, wherein said rotor support means is further provided with a step formed inside of said circumferential wall means for housing said ball bearing means.

15. A brushless motor as claimed in claim 14, wherein said rotor support means is further provided with an elastic member between said ball bearing means and said step for pressing said bearing means.

16. A brushless motor as claimed in claim 1, wherein said projection forms a gap with said rotor support.

17. A brushless motor as claimed in claim 16, wherein said projection extends from said flange and is bent away from said spindle.

18. A brushless motor comprising:
  rotor means provided with a spindle and a plurality of multi-polarized magnets arranged around said spindle;
  stator means comprising surface means having a first surface and a second surface opposed to each other and provided with a magnetic field generation means on said first surface for generating a magnetic field working on said multi-polarized magnets to rotate said rotor means, said surface means made of a flat and rigid material; and
  rotor support means inserted in said stator means and comprising:
    a rotor support for rotatably supporting said spindle so that said rotor means can rotate, a flange extending along said second surface for exerting force against said second surface, said flange defining an opening which coincides with a channel formed in said stator means, and a projection bendable from a first position before said rotor support means is inserted in the stator means to a second position after said rotor support means is inserted in the stator means, wherein, in said second position said projection is bent towards said first surface to create said force, said projection and said rotor support means forming a recess therebetween.

19. A brushless motor as claimed in claim 18 wherein said rotor support means is formed in a tubular shape defined by a circumferential wall means for supporting said spindle means and a circular flange means formed around said circumferential wall means.

20. A brushless motor as claimed in claim 18 said rotor support means further including a projection bent towards said first surface to create said force.

21. A brushless motor as claimed in claim 18, wherein said projection extends from said flange and is bent away from said spindle.

22. A brushless motor as claimed in claim 18, wherein said stator means includes a coil, and a conductor extends from said coil and towards said first surface via said channel.

23. A brushless motor according to claim 18, wherein said rotor support means and said projection form said recess therebetween so that mechanical stress associated with bending of said projection is substantially isolated to said projection to substantially prevent said stress from being transmitted to the rotor support means.

24. A brushless motor according to claim 18, wherein said projection extends away from said rotor support means at a location adjacent to said recess, said projection bent to curve away from said rotor support means.

25. A brushless motor according to claim 24, wherein said projection is curved so that it extends perpendicularly away from said rotor support means.

* * * * *

UNITED STATES PATENT AND TRADE MARK OFFICE
CERTIFICATE OF CORRECTION

PATENT NO. : 6,005,312
DATED : December 21, 1999
INVENTOR(S) : Yamane

It is certified that error appears in the above-identified patent and that said Letters Patent is hereby corrected as shown below:

Column 4, line 22, "betgween" should read --between--.

Column 8, line 41, after "projection" insert --is--.

Signed and Sealed this

Thirtieth Day of January, 2001

*Attest:*

Q. TODD DICKINSON

*Attesting Officer*  *Director of Patents and Trademarks*